United States Patent Office 3,352,633
Patented Nov. 14, 1967

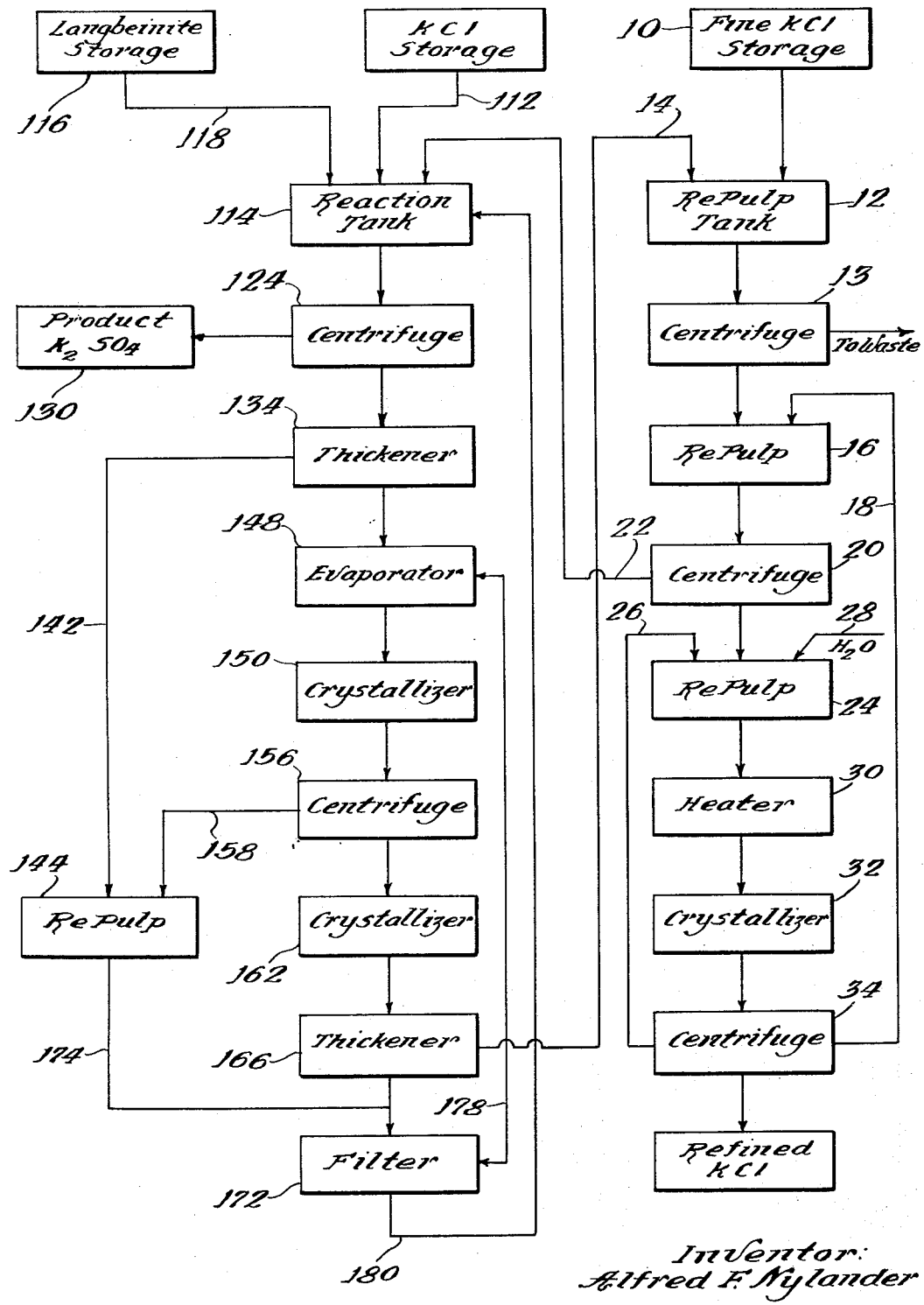

3,352,633
PROCESS FOR MAKING PURIFIED POTASSIUM CHLORIDE AND POTASSIUM SULFATE FROM SULFATE-CONTAMINATED POTASSIUM CHLORIDE AND LANGBEINITE
Alfred F. Nylander, Redwood City, Calif., assignor to International Minerals & Chemical Corporation, a corporation of New York
Filed Dec. 30, 1963, Ser. No. 334,131
4 Claims. (Cl. 23—89)

ABSTRACT OF THE DISCLOSURE

This invention relates to an integrated washing and recrystallization process for the manufacture of potassium sulfate and purified potassium chloride from flotation concentrates of potassium chloride and langbeinite contaminated with an objectionable sulfate salt content.

---

This invention relates to a method for the purification of potassium chloride. More specifically, the invention relates to an improved integrated process for the manufacture of purified potassium chloride and commercial potassium sulfate from sulfate-contaminated potassium chloride and langbeinite.

Potassium chloride of fertilizer grade is commercially prepared by the flotation of sylvite from sylvinite ores. The flotation concentrate thus obtained ordinarily contains about 95% potassium chloride, the mineral having various impurities such as magnesium chloride, sodium chloride, sodium and potassium sulfate, and perhaps minor amounts of complex salts such as carnallite and langbeinite.

In the manufacture of purified potassium chloride from such flotation concentrates, the concentrate, in accordance with the prior art, is dissolved in water or brine at an elevated temperature and recrystallized as purified potassium chloride by cooling the saturated brine. For the process to be economical, it is necessary to find some way of utilizing the brine from which the purified potassium chloride is recrystallized. Generally, such brine is recycled to the step in which the potassium chloride is dissolved. Eventually, build-up of impurities within the brine makes it necessary to continuously add water to the recrystallization circuit and bleed brine therefrom. Usually, the losses of potassium chloride in the bleed stream are so great that such recrystallization processes are economical only where the bleed stream can be used in some other plant operation.

It has been found that a serious problem exists when the flotation concentrate to be purified contains more than very small amounts of sulfate salts. In order to obtain a chemically pure potassium chloride product from the recrystallization, it is necessary that the sulfate ion concentration in the liquor from which the potassium chloride is recrystallized be maintained at a level not in excess of about 0.3% by weight. Thus, it is seen, that where the flotation concentration contains sulfate salts in appreciable quantities, the bleed stream from the recrystallization process must be made so large, to maintain the 0.3% sulfate ion concentration, that the potassium chloride losses in the bleed stream make operation of the process uneconomical.

It is an object of the invention to provide an improved process for the purification of sulfate-contaminated potassium chloride which permits economical operation at relatively high sulfate contaminant levels.

Another object of the invention is to provide an integrated process for the washing and recrystallization of sulfate-contaminated potassium chloride which provides a chemically pure product while maintaining potassium chloride losses at a reasonable level.

Another object of this invention is to provide an integrated process for the purification of sulfate-contaminated potassium chloride and the manufacture of potassium sulfate from potassium chloride and langbeinite in which waste material from the potassium chloride purification is utilized in potassium sulfate manufacture, and a waste stream from the potassium sulfate manufacture is utilized in the purification of the potassium chloride.

Other objects of the invention will become apparent from the following description.

Briefly, the method of this invention involves the repulping of a sulfate-contaminated potassium chloride product with a liquor which is saturated with potassium chloride, unsaturated with respect to sulfate salts, and has a magnesium ion concentration of at least 2.0% by weight. It has been found that the sulfate salt concentration of the impure potassium chloride can thus be reduced to a level which can readily be tolerated in recrystallization processes without excessive loss of potassium values.

In accordance with this invention, it has been found that where the sulfate content of the flotation concentrate to be purified exceeds about 2% by weight the volume of the brine that must be bled from the recrystallization circuit to maintain the sulfate ion concentration at the requisite level not in excess of 0.3% by weight becomes excessive, and the recrystallization process becomes uneconomical. It has been found, however, that the sulfate salt content of the impure potassium chloride feed to the recrystallization process can be reduced to an acceptable level, i.e., substantially below 2% by weight, by repulping the contaminated potassium chloride with a brine which is saturated with respect to potassium chloride, unsaturated with respect to sulfate salts, and has a magnesium ion concentration of at least 2% by weight and preferably of at least 5% by weight. The upper limit of the magnesium ion concentration is the solubility limit of the magnesium ion in the brine. The ratio of brine to feed is not critical, but the ratio to some extent influences the sulfonate content of the washed feed. Satisfactory results have been obtained using equal amounts of brine and feed. The temperature of the brine is not critical, and operation at ambient temperatures is contemplated. More preferably, the brine will be maintained at at temperature of about 50° C. during the repulping operation. The time during which the brine and feed are maintained as a slurry prior to separation, as in a centrifuge, is not critical. Satisfactory results have been obtained over various times from 15 minutes to 90 minutes. Surprisingly, it has been found that by treating the impure potassium chloride with a brine, as defined in this specification, not only are the potassium chloride losses eliminated, but the sulfate ion concentration is reduced to a lower level than that obtainable by leaching with an equal volume of water. This effect is believed to be attributable to the presence of the magnesium ion in the brine. This process is adaptable to the treatment of impure potassium chloride flotation products, or potassium chloride obtained by other processes, wherein the potassium chloride is contaminated with sulfate salts. The particle size of the potassium chloride feed is not critical, but it is preferred that the potassium chloride feed consists predominantly of a —65 mesh fraction of a flotation concentrate. More particularly, it is preferred that a major portion of the feed be —100 mesh.

*Example 1*

A predominantly —65 mesh fraction of a flotation concentrate obtained from sylvinite ore containing minor amounts of langbeinite was repulped with an equal weight of brine at 50° C. Within 15 minutes the sulfate contamination of the concentrate had reached a minimum level about one-half of the original value. Analysis of flotation concentrate, of the brine utilized, and final analysis of the treated flotation concentrate and discard liquor, together with the sulfate levels in the solid and liquid phases after various periods of contact, are set forth in Table I.

TABLE I

|  | K | Mg | Na | Cl | SO₄ | Insol. | H₂O |
|---|---|---|---|---|---|---|---|
| Chemical Plant Feed | 48.98 | .60 | .54 | 45.50 | 2.05 | .41 | .36 |
| Reject Liquor | 3.40 | 5.44 | 1.06 | 18.00 | 3.50 | | |
| Time, Minutes: | | | | | | | |
| 15—Solid | | | | | .92 | | |
| Liquor | | | | | 4.13 | | |
| 30—Solid | | | | | 1.08 | | |
| Liquor | | | | | 4.08 | | |
| 60—Solid | | | | | 1.05 | | |
| Liquor | | | | | 4.08 | | |
| 90—Solid | 49.30 | .37 | .03 | 45.00 | 1.15 | .47 | 3.24 |
| Liquor | 3.27 | 5.29 | 1.67 | 18.18 | 3.77 | | |

It will be observed that the potassium content of the concentrate (expressed as K₂O) increased from 59.0% to 61.4% as a result of removing about 45% of the sulfate (as magnesium sulfate) and removing all of the sodium chloride. No slimes were released in the repulping step.

*Example 2*

The experiment of Example 1 was repeated operating at a temperature of 30° C., and using a —65 mesh flotation concentrate fraction of identical composition, and a brine very similar in composition to that used in Example 1. Again, equal weights of feed and brine were used. The results are set forth in Table II.

TABLE II

|  | K | Mg | Na | Cl | SO₄ | Insol. | H₂O |
|---|---|---|---|---|---|---|---|
| Chemical Plant Feed | 48.98 | .60 | .54 | 45.50 | 2.05 | .41 | .36 |
| Reject Liquor | 3.44 | 5.30 | 1.15 | 17.80 | 3.46 | | |
| Time, Minutes: | | | | | | | |
| 15—Solid | | | | | 1.08 | | |
| Liquor | | | | | 4.11 | | |
| 30—Solid | | | | | .92 | | |
| Liquor | | | | | 4.20 | | |
| 60—Solid | | | | | .97 | | |
| Liquor | | | | | 4.16 | | |
| 90—Solid | 51.52 | .24 | .07 | 46.80 | 1.00 | | |
| Liquor | 2.89 | 5.45 | 1.85 | 18.24 | 4.24 | | |

Minimum sulfate levels were obtained in 15 to 30 minutes. The sulfate content of the concentrate was reduced to about one-half of the original value, making the concentrate suitable for further processing in a recrystallization operation to produce a chemically pure product.

The process of this invention will be described in detail with respect to the drawing. Fine potassium chloride produced by the flotation of an ore initially containing about 35% by weight of sylvite, about 45% by weight of halite, about 10% by weight of langbeinite, and about 10% by weight of other impurities, which fine potassium chloride is 95% —65 mesh and 50% —100 mesh is fed from storage 10 to repulp tank 12, where it is repulped with brine introduced to repulp tank through line 14. After a residence of 30 minutes in the repulp tank, the slurry is transferred to centrifuge 13 where the solids and liquids are separated and the brine rejected to waste. The analysis of the fine potassium chloride feed and of the washed brine input into repulp tank, as well as the analysis of the washed potassium chloride separated in centrifuge 13, are set forth in Table III.

TABLE III

|  | K | Mg | Na | Cl | SO₄ | H₂O | Total |
|---|---|---|---|---|---|---|---|
| Fine KCl | 259.4 | 5.3 | 20.3 | 265.5 | 19.0 | | 569.5 |
| Wash Brine | 14.6 | 29.8 | 7.2 | 102.5 | 12.1 | 364.3 | 530.5 |
| Washed KCl | 258.7 | 2.4 | 4.7 | 242.2 | 9.7 | | 520.8 |

The washed potassium chloride is transferred from centrifuge 13 to repulp tank 16, and admixed with recycled brine introduced through line 18. After a residence period of 15 minutes the recycled brine and repulped solids are transferred to centrifuge 20, where the solids and liquid are separated. The liquid phase is removed through line 22 as input to a potassium sulfate manufacturing process, while the solids are transferred to repulp tank 24 and slurried with a mixture of recycled brine introduced through line 26 and water introduced through line 28. After a residence time about 15 minutes the repulp slurry is transferred to heater 30, wherein the temperature of the slurry is raised to a value approaching 100° C., but less than the boiling point of the brine, to dissolve the potassium chloride content of the solids introduced to repulp tank 24. The volumes of water and recycled brine are adjusted to provide a substantially saturated solution of potassium chloride at the elevated temperature to which the solution is heated. The slurry is transferred to heater 30 and all of the solids are dissolved. The solution is transferred from heater 30 to crystallizer 32 where the temperature is reduced to a value slightly in excess of ambient temperatures to crystallize purified potassium chloride. The resulting slurry is transferred to centrifuge 34 wherein the crystallized potassium chloride of chemical purity is separated and transferred to drying and storing facilities. The liquid phase is recycled through lines 18 and 26 as the input to repulp tanks 16 and 24, respectively. A condensed material balance for the process steps from the repulping in repulp tank 16 to the final centrifuge operation is set forth in Table IV.

TABLE IV

|   |   | K | Mg | Na | Cl | SO$_4$ | H$_2$O | Total |
|---|---|---|---|---|---|---|---|---|
| 1 | Washed KCl | 258.7 | 2.4 | 4.7 | 242.2 | 9.7 |  | 520.8 |
|   | Final Centrifuge Recycle | 120.9 | .3 | .9 | 109.8 | 2.8 | 662.6 | 897.3 |
| 2 | Intermediate Centrifuge Feed | 379.6 | 2.7 | 8.7 | 356.7 | 12.5 | 662.6 | 1,422.8 |
|   | Solids | 251.3 | .3 | .9 | 228.2 | 2.8 |  | 483.5 |
|   | Liquor to K$_2$SO$_4$ Process | 128.3 | 2.4 | 4.7 | 123.8 | 9.7 | 662.6 | 934.6 |
| 3 | Repulp Solids | 251.3 | .3 | .9 | 228.2 | 2.8 |  | 483.5 |
|   | Final Centrifuge Recycle | 140.2 | .3 | 1.0 | 127.3 | 3.2 | 767.9 | 1,039.8 |
|   | H$_2$O Input |  |  |  |  |  | 662.6 | 662.6 |
|   | Total | 391.5 | .6 | 1.9 | 355.5 | 6.0 | 1,430.5 | 2,186.0 |
| 4 | Centrifuge Feed | 391.5 | .6 | 1.9 | 355.5 | 6.0 | 1,430.5 | 2,186.0 |
|   | Solids | 130.4 |  |  | 118.4 |  |  | 248.8 |
|   | Effluent to Repulp 16 | 120.9 | .3 | .9 | 109.8 | 2.8 | 662.6 | 897.4 |
|   | Effluent to Repulp 26 | 140.2 | .3 | 1.0 | 127.3 | 3.2 | 767.9 | 1,039.8 |
|   | Product to Storage at 85% Rec | 109.3 |  |  | 99.2 |  |  | 208.5 |
|   | Undistributed Loss | 21.1 |  |  | 19.2 |  |  | 40.3 |

It will be noted that the refined product is substanitally free of magnesium, sodium, and sulfate and that the effluent from centrifuge 34 is maintained at a sulfate ion concentration just below 0.3%.

The portion of the process relating to the manufacture of potassium sulfate from langbeinite and potassium chloride is described in detail in application Ser. No. 267,030, filed Mar. 21, 1963, by William B. Dancy. Operative ranges of temperature, feed ratio, and process conditions are set forth in detail therein, and those skilled in the art are referred thereto.

Referring again to the drawing, an aqueous slurry, the solid phase of which is potassium chloride, and the liquid phase of which is saturated with respect to potassium chloride, is conducted to reaction vessel 114 by means of line 112. Solid langbeinite (95% —200 mesh) from storage 116 enters the reaction vessel 114 by means of line 118, and brine from centrifuge 20 is conveyed to the vessel by line 22. The mixture is agitated at a temperature between about 45° C. and 55° C. until the reaction proceeds to substantial completion, that is, about six hours. Although only one reaction vessel is illustrated, more reaction vessels with a countercurrent process flow may be used. Such countercurrent processing is known to the art and therefore is not described herein. Thereafter, the reactant mixture is transferred to centrifuge 124 and the potassium sulfate product is removed from the centrifuge 124 and is conveyed to storage 130.

The mother liquor or aqueous medium is withdrawn from centrifuge 124 and conducted to thickener 134 (a settling tank). Supernatant liquid is withdrawn from thickener 134 through line 142 to repulp tank 144, and the thickened aqueous medium is withdrawn to evaporator 148. The evaporator is maintained at about 98° C. The concentrated aqueous medium, now a slurry, is transferred from the evaporator to crystallizer 150, and then to centrifuge 156. The capacity of the crystallizer 150 is sufficient to provide a retention time of 1 to 5 hours for the crystallization of langbeinite from the super-saturated aqueous medium. The temperature in the surge tank is maintained at 80° to 100° C., preferably at about 90° C., but without further substantial evaporation. The aqueous medium, now a thick slurry, is centrifuged at 80° to 100° C. to separate a solids fraction which is passed through line 158 to repulp tank 144, and an aqueous fraction which is passed to crystallizer 162. The aqueous fraction is cooled in the crystallizer to a temperature in the range of 25° to 40° C., preferably about 30° C. The resulting slurry is conveyed to thickener 166 where solids comprising potassium chloride, substantially free of sodium chloride, are separated and removed to filter 172. The filtrate, which is saturated with potassium chloride and contains magnesium chloride and sodium chloride, is removed by line 14 and conducted to repulp tank 12. Repulped langbeinite (converted to leonite) is withdrawn from repulp tank 144 and carried to filter 172 through line 174. The liquid fraction from filter 172 passes through line 178 as recycle to evaporator 148, and the solids are recycled through line 180 as input to reaction vessel 114.

The reaction tank 114 is charged as follows:

TABLE V

|   | K | Mg | Na | Cl | SO$_4$ | H$_2$O | Total |
|---|---|---|---|---|---|---|---|
| Langbeinite | 51.6 | 32.1 | 3.3 | 5.2 | 185.2 |  | 282.4 |
| KCl solution | 105.9 | .7 | 3.9 | 102.1 | 7.8 | 565.1 | 780.5 |
| Water |  |  |  |  |  | 418.5 | 418.5 |
| Mixed salt: |  |  |  |  |  |  |  |
| Leonite | 20.7 | 6.4 |  |  | 50.9 | 19.0 | 97.0 |
| Langbeinite | 2.0 | 1.2 |  |  | 7.4 |  | 10.6 |
| KCl | 82.7 |  |  | 75.2 |  |  | 157.9 |
| Entrained Liquor | 4.5 | 2.7 | .4 | 10.8 | 2.7 | 53.7 | 74.8 |
| Total | 267.4 | 43.1 | 7.6 | 193.3 | 254.0 | 1,056.3 | 1,821.7 |

The reaction proceeded at about 45° C. The initial temperature was slightly lower but the reaction is exothermic and equilibrium was established at about 45° C. The reaction reached substantial completion after about 4 hours. The reaction products were removed to the centrifuge and separated into solid product (potassium sulfate) and mother liquor, having the following compositions:

TABLE VI

|   | K | Mg | Na | Cl | SO$_4$ | H$_2$O | Total |
|---|---|---|---|---|---|---|---|
| Mother liquor | 124.5 | 40.1 | 7.7 | 188.5 | 73.1 | 1,028.4 | 1,462.2 |
| Solids to drier | 142.9 | 3.0 |  | 4.8 | 180.9 | 27.9 | 359.5 |

The mother liquor (aqueous medium) was thickened and evaporated at about 98° C., until the sodium chloride content became nearly sufficient to saturate the aqueous medium at 30° C. (magnesium chloride content about 18%). The resulting slurry was maintained at about 90° C. without further evaporation for about 2 hours to permit the crystallization of langbeinite from the supersaturated slurry. The slurry was centrifuged at 90° C. The evaporation, crystallization and separation data are as follows:

TABLE VII

|  | K | Mg | Na | Cl | $SO_4$ | $H_2O$ | Total |
|---|---|---|---|---|---|---|---|
| Feed liquor | 95.3 | 39.2 | 7.5 | 173.7 | 53.3 | 988.1 | 1,357.1 |
| $H_2O$ evaporation |  |  |  |  |  | 560.4 | 560.4 |
| Solids to repulp | 50.3 | 6.8 |  | 35.9 | 40.1 |  | 133.1 |
| Entrained liquor to repulp | 2.3 | 1.6 | .2 | 6.9 | .7 | 21.6 | 33.3 |

The solids from the centrifuge were transferred to the repulper and reacted with aqueous medium (mother liquor) withdrawn as supernatant liquid from the thickener. The repulper reaction proceeded at 60° to 65° C. to produce leonite and magnesium chloride. The repulper operation is summarized as follows:

TABLE VIII

|  | K | Mg | Na | Cl | $SO_4$ | $H_2O$ | Total |
|---|---|---|---|---|---|---|---|
| Mother liquor | 124.5 | 40.1 | 7.6 | 188.5 | 73.1 | 1,028.4 | 1,462.2 |
| Solids-Langbeinite | 10.9 | 6.8 |  |  | 40.1 |  | 57.8 |
| KCl | 39.4 |  |  | 35.9 |  |  | 75.3 |
| Entrained liquor | 2.3 | 1.6 | .2 | 6.9 | .7 | 21.6 | 33.3 |
| Liquor to Evaporators | 95.3 | 39.2 | 7.5 | 173.7 | 53.3 | 988.1 | 1,357.1 |
| Mixed salt to filter: |  |  |  |  |  |  |  |
| Leonite | 2.7 | 6.4 |  |  | 50.9 | 19.0 | 97.0 |
| Langbeinite | 2.0 | 1.2 |  |  | 7.4 |  | 10.6 |
| KCl | 55.0 |  |  | 50.1 |  |  | 105.1 |
| Entrained liquor | 4.1 | 1.7 | .3 | 7.5 | 2.3 | 42.9 | 58.8 |

The liquid fraction from the centrifuge at 90° C. was cooled to 30° C. in the crystallizer and then thickened. These operations are summarized as follows:

TABLE IX

|  | K | Mg | Na | Cl | $SO_4$ | $H_2O$ | Total |
|---|---|---|---|---|---|---|---|
| Feed liquor | 42.7 | 30.8 | 7.3 | 130.9 | 12.5 | 406.1 | 630.2 |
| Evaporation |  |  |  |  |  | 31.0 | 31.0 |
| Liquor to Repulp Tank 12 | 14.6 | 29.8 | 7.2 | 102.5 | 12.1 | 364.3 | 530.5 |
| KCl to filter | 27.7 |  |  | 25.1 |  |  | 52.8 |
| Entrained liquor to filter | .4 | 1.0 | .1 | 3.3 | .4 | 10.8 | 16.0 |

The solids from the filter were recycled as input to the reaction vessel, the data herein set forth being equilibrium data for the continuous operation.

In comparison with a similar operation in accordance with a prior art process in which the langbeinite content of the mother liquor was not recovered at high temperature after the evaporation step, but was recovered in part at low temperature with the recovery of potassium chloride in the crystallizer; a much higher sulfate content in the liquor from the thickener resulted, making this liquor unfit for further use. In further comparison with an operation carried out in accordance with the prior art in which a fine potassium chloride flotation concentrate having a sulfate content in excess of 2% by weight, to wit, 2.3% by weight, which sulfate content is not reduced prior to recrystallization of the fine potassium chloride feed to produce a chemically pure potassium chloride, a much larger bleed stream is required. Specifically, to treat a fine potassium chloride flotation concentrate identical with the concentrate treated in accordance with the foregoing specific example, with the exception that the sulfate content is increased to 12.3 and the magnesium content increased to 3.0, when treated in accordance with the afore-described process but without pretreatment to reduce the sulfate concentration, requires a water input of 840.1, as compared with a water input of 662.6 in the foregoing specific example. Similarly, the bleed stream must be increased to 1185.3, from 934.6. Since this bleed stream is saturated with potassium chloride, the losses of potassium values are apparent.

Another definite advantage in the process of this invention resides in the fact that the water requirements for the purification of the potassium chloride flotation concentrate to chemically pure standards is reduced. Sulfate contaminated muriate flotation concentrates are found chiefly in the Carlsbad district of New Mexico, which district is the principal potassium producing area in the United States. Water in this area is, unfortunately, in very short supply, and mining companies are generally limited by law to a maximum water usage.

While the invention has been described with special emphasis upon the several preferred embodiments thereof, and has been illustrated with reference to specific examples, it will be understood that within the scope of the appended claims the invention can be practiced otherwise than as specifically described.

The embodiments of the invention in which an exclusive property or privilege is claimed are defined as follows:

1. A method for making purified potassium chloride and potassium sulfate from langbeinite and a fine sylvite flotation concentrate fraction containing in excess of about 2% by weight of sulfate as sulfate salts, comprising repulping said fraction with a brine which is saturated with potassium chloride, unsaturated with sulfate salts, and has a magnesium ion content of at least 2%, separating said brine from said fraction, dissolving said fraction in hot aqueous liquid to produce a liquor substantially saturated with potassium chloride, cooling said liquor to recrystallize said potassium chloride therefrom, separating said purified potassium chloride as product, mixing said liquor with langbeinite and potassium chloride, maintaining the resulting mixture at an elevated temperature to produce potassium sulfate and magnesium chloride by reaction of langbeinite and potassium chloride, separating crystallized potassium sulfate from the mother liquor, cooling the mother liquor and separating crystallized solids therefrom to obtain the aforesaid brine.

2. The method in accordance with claim 1 including the steps of evaporating water from said mother liquor after separation of potassium sulfate therefrom, then maintaining the mother liquor at 80 to 100° C. to crystallize langbeinite, and then separating crystallized langbeinite from the mother liquor, whereby the sulfate content of the aforesaid brine is maintained at a reduced level.

3. The method in accordance with claim 2 in which the aforesaid brine has a magnesium ion content of at least 5% by weight.

4. The method in accordance with claim 3 in which the aforesaid brine is unsaturated with respect to sodium chloride.

References Cited

UNITED STATES PATENTS

| | | | |
|---|---|---|---|
| 1,112,770 | 10/1914 | Clarke | 23—128 |
| 2,394,570 | 2/1946 | Sturbelle | 23—89 X |
| 2,613,133 | 10/1952 | Anderson | 23—89 |
| 2,684,285 | 7/1954 | Dancy | 23—121 |
| 2,758,912 | 8/1956 | Dancy | 23—89 X |
| 2,804,370 | 8/1957 | Dancy et al. | 23—38 |
| 2,804,371 | 8/1957 | Dancy et al. | 23—121 X |
| 2,809,093 | 10/1957 | Dancy | 23—38 |
| 2,927,010 | 3/1960 | Le Baron. | |
| 3,207,576 | 9/1965 | Marullo | 23—128 X |

FOREIGN PATENTS 527,959  7/1956  Canada.

OSCAR R. VERTIZ, *Primary Examiner.*

EDWARD STERN, *Examiner.*

UNITED STATES PATENT OFFICE
CERTIFICATE OF CORRECTION

Patent No. 3,352,633                                  November 14, 1967

Alfred F. Nylander

It is certified that error appears in the above identified patent and that said Letters Patent are hereby corrected as shown below:

Column 2, line 40, "sulfonate" should read -- sulfate --; line 45, "at", second occurrence, should read -- a --. Columns 7 and 8, TABLE VIII, second column, line 6 thereof, "2.7" should read -- 20.7 --.

Signed and sealed this 29th day of July 1969.

(SEAL)
Attest:

Edward M. Fletcher, Jr.                      WILLIAM E. SCHUYLER, JR.
Attesting Officer                                  Commissioner of Patents